(12) United States Patent
Uemura et al.

(10) Patent No.: US 8,413,510 B2
(45) Date of Patent: Apr. 9, 2013

(54) ACCELERATION SENSOR

(75) Inventors: Takeshi Uemura, Osaka (JP); Toshiyuki Nozoe, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/529,675

(22) PCT Filed: Mar. 6, 2008

(86) PCT No.: PCT/JP2008/000458
§ 371 (c)(1),
(2), (4) Date: Sep. 2, 2009

(87) PCT Pub. No.: WO2008/111291
PCT Pub. Date: Sep. 18, 2008

(65) Prior Publication Data
US 2010/0107764 A1    May 6, 2010

(30) Foreign Application Priority Data

Mar. 9, 2007    (JP) ................................ 2007-059449

(51) Int. Cl.
*G01P 15/125*    (2006.01)
(52) U.S. Cl. ................................... 73/514.32
(58) Field of Classification Search ........... 73/514.32
See application file for complete search history.

(56) References Cited

U.S. PATENT DOCUMENTS

| | | | |
|---|---|---|---|
| 5,806,365 A | 9/1998 | Zunino et al. | |
| 5,952,572 A | 9/1999 | Yamashita et al. | |
| 2003/0029239 A1* | 2/2003 | Hatanaka et al. | 73/504.16 |

FOREIGN PATENT DOCUMENTS

| | | |
|---|---|---|
| JP | 04-278464 A | 10/1992 |
| JP | 09-043068 A | 2/1997 |
| JP | 09-196682 A | 7/1997 |
| JP | 10-48247 A | 2/1998 |
| JP | 10-177034 A | 6/1998 |
| JP | 11-248741 A | 9/1999 |

OTHER PUBLICATIONS

International Search Report for PCT/JP2008/000458.
Japanese Office action for application 2007-059449 dated Jun. 5, 2012.

* cited by examiner

*Primary Examiner* — John Fitzgerald
*Assistant Examiner* — Gregory J Redmann
(74) *Attorney, Agent, or Firm* — Pearne & Gordon LLP (57) ABSTRACT

An acceleration sensor includes first and second opposed electrode units. The first opposed electrode unit includes a first electrode and a second electrode spaced away from and facing the first electrode, and provides a first capacitance. The second opposed electrode unit includes a third electrode and a fourth electrode spaced away from and facing the third electrode, and provides a second capacitance. The first and third electrodes are arranged along a first direction. A component of acceleration along the first direction applied to the object is detected based on the first and second capacitances. A control voltage is applied to the first and second opposed electrode units. The control voltage is changed when both of the first capacitance and the second capacitance simultaneously increase or decrease. This acceleration sensor detects the acceleration accurately.

14 Claims, 9 Drawing Sheets

PRIOR ART

ACCELERATION SENSOR

TECHNICAL FIELD

The present invention relates to an acceleration sensor to be used in various electronic devices which perform attitude-control or navigation for mobile carriers, such as airplanes, cars, robots, vessels, or vehicles.

BACKGROUND ART

Figure 13:
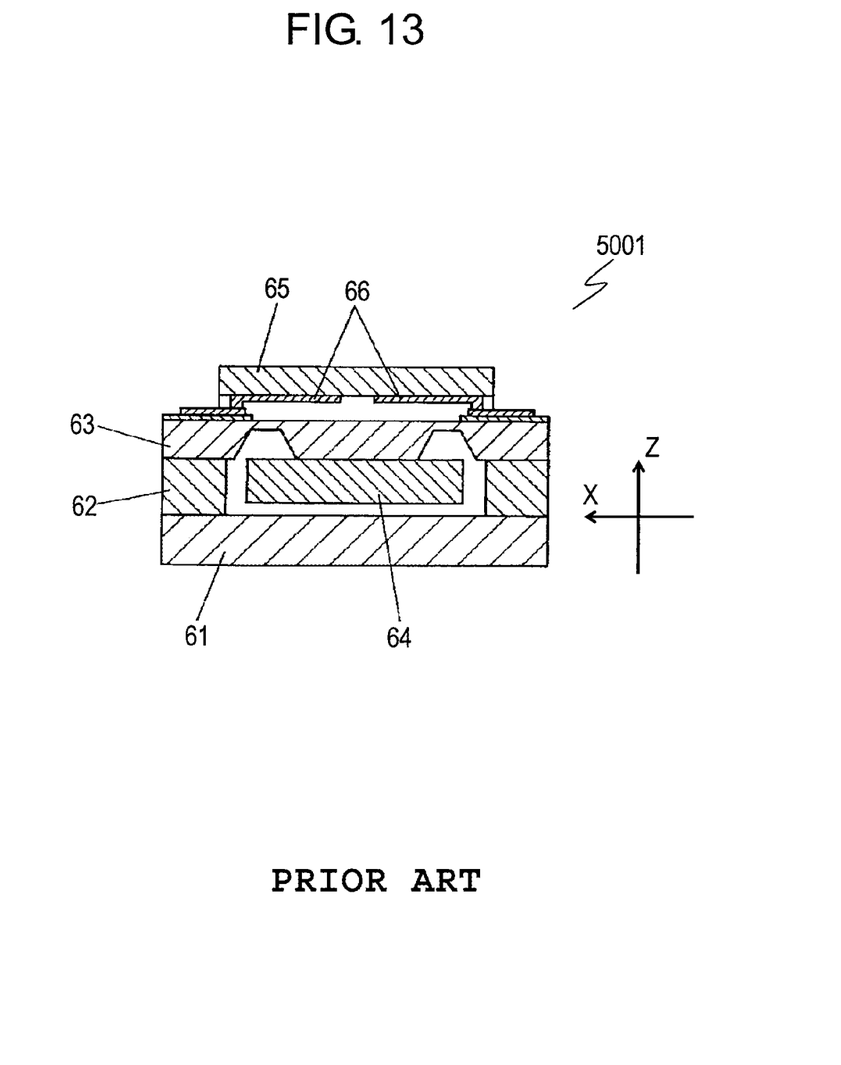
FIG. 13 is a sectional view of a conventional acceleration sensor of prior art.

FIG. 13 shows a sectional view of conventional acceleration sensor 5001 disclosed in Patent Document 1. Acceleration sensor 5001 comprises the following elements: mount substrate 61, base glass 62 placed on mount substrate 61, flexible substrate 63 placed on base glass 62, weight 64 placed on a lower surface of flexible substrate 63. Glass substrate 65 is placed above flexible substrate 63 to face flexible substrate 63. Opposed electrodes 66 placed on respective surfaces of flexible substrate 63 and glass substrate 65 facing each other. Weight 64 placed on the lower surface of flexible substrate 63 is movable.

An operation of acceleration sensor 5001 will be described below. An acceleration applied to sensor 5001 urges weight 64 along the direction of the acceleration, and causes flexible substrate 63 having weight 64 attached thereon to warp, thereby displacing flexible substrate 63. This displacement changes the distance between flexible substrate 63 and glass substrate 65, accordingly changing a capacitance between opposed electrodes 66. The sensor detects the acceleration based on the change in the capacitance due to the change in the distance between electrodes 66.

Acceleration sensor 5001 is oriented along the direction of the acceleration to be sensed in an attitude control device or a navigation system of mobile carriers, such as vehicles.

Acceleration sensor 5001 detects the acceleration based on the change in the capacitance between opposed electrodes 66. Weight 64 is placed on the lower surface of flexible substrate 63 and located above away from mount substrate 61. This arrangement causes weight 64 to be displaced easily in a direction of a Z-axis along which weight 64 and mount substrate 61 are arranged.

For instance, if weight 64 moves along the Z-axis to move electrodes 66 away from each other, the capacitance between opposed electrodes 66 decreases. Even if acceleration along an X-axis or a Y-axis is applied, weight 64 can hardly move along the X-axis or the Y-axis, accordingly changing the capacitance between opposed electrodes 66 due to the acceleration by a small amount. Acceleration sensor 5001 cannot detect the acceleration along the X-axis or the Y-axis accurately.

Patent Document 1: JP10-177034A

SUMMARY OF INVENTION

An acceleration sensor includes a mount section arranged to be fixed to an object, a flexible section coupled to the mount section, a weight coupled to the mount section via the flexible section, and first and second opposed electrode unit. The first opposed electrode unit includes a first electrode placed on the weight and a second electrode spaced away from and facing the first electrode, and provides a first capacitance. The second opposed electrode unit includes a third electrode placed on the weight and a fourth electrode spaced away from and facing the third electrode, and provides a second capacitance. The first and third electrodes are arranged along a first direction. The second and fourth electrodes are spaced away from and face the first and third electrodes along a second direction perpendicular to the first direction, respectively. A component of an acceleration along the first direction applied to the object is detected based on the first and second capacitances. A control voltage is applied to the first and second opposed electrode units. The control voltage is changed when both of the first capacitance and the second capacitance simultaneously increase or decrease.

This acceleration sensor detects the acceleration accurately.

REFERENCE NUMERALS

2A Weight (First Weight)
2B Weight (Second Weight)
2C Weight (Third Weight)
2D Weight (Fourth Weight)
4 Mount Section
8 Arm (Flexible Section)
10A Arm (Flexible Section)
10B Arm (Flexible Section)
10C Arm (Flexible Section)
10D Arm (Flexible Section)
12 Supporter (Flexible Section)
14 Opposed Electrode Unit (First Opposed Electrode Unit)
14A Electrode (First Electrode)
14B Electrode (Second Electrode)
16 Opposed Electrode Unit (Second Opposed Electrode Unit)
16A Electrode (Third Electrode)
16B Electrode (Fourth Electrode)
18 Opposed Electrode Unit (Third Opposed Electrode Unit)
18A Electrode (Fifth Electrode)
18B Electrode (Sixth Electrode)
20 Opposed Electrode Unit (Fourth Opposed Electrode Unit)
20A Electrode (Seventh Electrode)
20B Electrode (Eighth Electrode)
114 Opposed Electrode Unit (First Opposed Electrode Unit)

114A Electrode (First Electrode)
114B Electrode (Second Electrode)
116 Opposed Electrode Unit (Second Opposed Electrode Unit)
116A Electrode (Third Electrode)
116B Electrode (Fourth Electrode)
214 Opposed Electrode Unit (Third Opposed Electrode Unit)
214A Electrode (Fifth Electrode)
214B Electrode (Sixth Electrode)
216 Opposed Electrode Unit (Fourth Opposed Electrode Unit)
216A Electrode (Seventh Electrode)
216B Electrode (Eighth Electrode)
602 Weight
604 Mount Section
610 Flexible Section
1002 Object
1003 Object
X X-Axis (First Direction)
Y Y-Axis (Third Direction)
Z Z-Axis (Second Direction)

DETAIL DESCRIPTION OF THE PREFERRED EMBODIMENT

Figure 1:
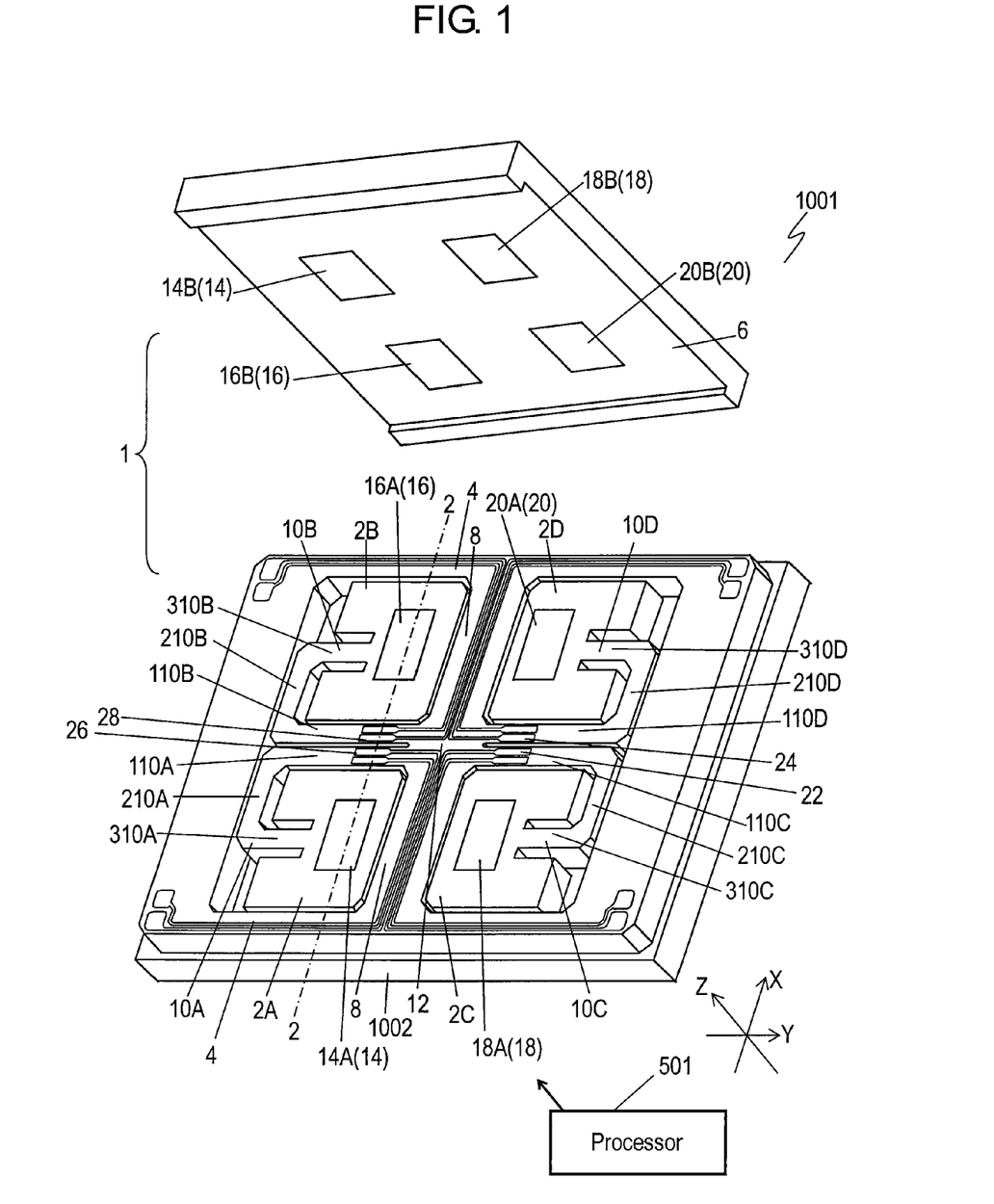
FIG. 1 is an exploded perspective view of an acceleration sensor in accordance with an exemplary embodiment of the present invention.
Figure 2:
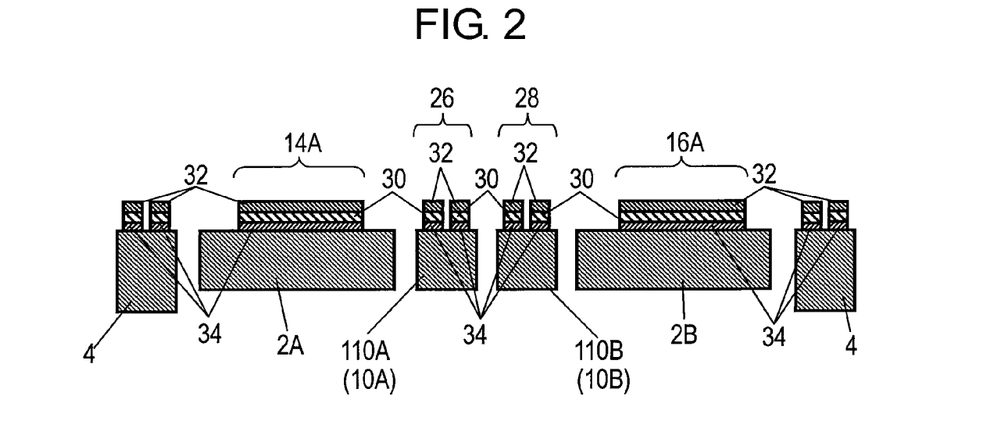
FIG. 2 is a sectional view of the acceleration sensor at line 2-2 shown in FIG. 1.

FIG. 1 is an exploded perspective view of sensor element 1 of acceleration sensor 1001 in accordance with an exemplary embodiment of the present invention. FIG. 2 is a cross-sectional view of sensor element 1 at line 2-2 shown in FIG. 1. Acceleration sensor 1001 includes sensor element 1 and processor 501 connected to sensor element 1, and detects an acceleration applied to object 1002.

As shown in FIG. 1, directions in parallel with an X-axis, a Z-axis, and a Y-axis are defined as first, second, and third directions perpendicular to each other, respectively. Sensor element 1 is fixed to object 1002. Two arms 8 extend from supporter 12 in parallel with the X-axis and are connected with mount section 4 having a frame shape. Supporter 12 is coupled to mount section 4 via arm 8. Mount section 4 is fixed to object 1002. Four arms 10A to 10D extend from supporter 12 in parallel with the Y-axis, and are connect with four weights 2A to 2D, respectively. Arms 8 and 10A to 10D are flexible. Arms 8 and 10A to 10D and supporter 12 provides a flexible section connected with mount section 4. Weights 2A to 2D are coupled to mount section 4 via the flexible section. Electrodes 14A, 16A, 18A, and 20A are provided on weights 2A, 2B, 2C, and 2D, respectively. Mount section 4 is mounted to substrate 6 on which electrodes 14B, 16B, 18B, and 20B are placed. Electrodes 14B, 16B, 18B, and 20B are spaced away from and electrodes 14A, 16A, 18A, and 20A in parallel with the Z-axis, respectively. Electrodes 14A and 14B provide opposed electrode unit 14 having a capacitance between the electrodes. Electrodes 16A and 16B provide opposed electrode unit 16 having a capacitance between the electrodes. Electrodes 18A and 18B provide opposed electrode unit 18 having a capacitance between the electrodes. Electrodes 20A and 20B provide opposed electrode unit 20 having a capacitance between the electrodes.

Electrodes 14A and 16A are arranged in parallel with the X-axis. Electrodes 14B and 16B are arranged in parallel with the X-axis. In other words, opposed electrode units 14 and 16 are arranged in parallel with the X-axis. Electrodes 18A and 20A are arranged in parallel with the X-axis. Electrodes 18B and 20B are arranged in parallel with the X-axis. In other words, opposed electrode units 18 and 20 are arranged in parallel with the X-axis. Electrodes 14A and 18A are arranged in parallel with the Y-axis. Electrodes 14B and 18B are arranged in parallel with the Y-axis. In other words, opposed electrode units 14 and 18 are arranged in parallel with the Y-axis. Electrodes 16A and 20A are arranged in parallel with the Y-axis. Electrodes 16B and 20B are arranged in parallel with the Y-axis. In other words, opposed electrode units 16 and 20 are arranged in parallel with the Y-axis. Arm 8 is much thinner than arms 10A to 10D, so that arm 8 has greater flexibility than arms 10A to 10D.

Arm 10A extending from supporter 12 has substantially a U-shape including extension 110A extending from supporter 12 in parallel with the Y-axis, extension 310A extending in parallel with extension 110A in parallel with the Y-axis, and coupler 210A coupling extension 110A to extension 310A. Coupler 210A extends from extension 110A in parallel with the X-axis. Extension 310A is connected with weight 2A. Arm 10B extending from supporter 12 has substantially a U-shape including extension 110B extending from supporter 12 in parallel with the Y-axis, extension 310B extending in parallel with extension 110B in parallel with the Y-axis, and coupler 210B coupling extension 110B to extension 310B. Coupler 210B extends from extension 110B in parallel with the X-axis in a direction opposite to coupler 210A of arm 10A. Extension 310B is connected with weight 2B. Arm 10C extending from supporter 12 has substantially a U-shape including extension 110C extending from supporter 12 in parallel with the Y-axis, extension 310C extending in parallel with extension 110B in parallel with the Y-axis, and coupler 210C coupling extension 110C to extension 310C. Coupler 210C extends from extension 110C in parallel with X-axis and in parallel with coupler 210A. Extension 310C is connected with weight 2C. Arm 10D extending from supporter 12 has substantially a U-shape including extension 110D extending from supporter 12 in parallel with the Y-axis, extension 310D extending in parallel with extension 110D in parallel with the Y-axis, and coupler 210D coupling extension 110D to extension 310D. Coupler 210D extends from extension 110D in parallel with the X-axis in a direction opposite to coupler 210C of arm 10C. Extension 310D is connected with weight 2D.

Arm 8 and supporter 12 are arranged substantially on a straight line. Extensions 110A and 110B of arms 10A and 10B extend from supporter 12 in the same direction. Extensions 110C and 110D of arms 10C and 10D extend from supporter 12 in the same direction opposite to extensions 110A and 110B. Arm 8 is symmetrical with respect to the center of sensor element 1. Arms 10A to 10D are symmetrically arranged with respect to the center of sensor element 1.

Driving electrode 22 causing weight 2C to vibrate is provided on arm 10C. Sensing electrode 24 detecting vibration of arm 10D is provided on arm 10D. Detecting electrodes 26 and 28 detecting distortion of arms 10A and 10B are provided on arms 10A and 10B, respectively.

As shown in FIG. 2, electrodes 14A and 16A and detecting electrodes 26 and 28 include lower electrodes 34 formed on weights 2A and 2B and arms 10A and 10B, piezoelectric layers 30 formed on lower electrodes 34, and upper electrodes 32 formed on piezoelectric layers 30. Similarly, electrodes 18A and 20A, driving electrode 22, and sensing electrode 24 include lower electrodes formed on weights 2C and 2D and arms 10C and 10D, piezoelectric layers formed on the lower electrodes, and upper electrodes formed on the piezoelectric layers. Electrodes 14A, 16A, 18A, and 20A do not necessarily include piezoelectric layer 30 or upper electrode 32. In this case, electrodes 14A, 16A, 18A, and 20A includes only lower electrodes 34 provided on weights 2A, 2B, 2C, and 2D, respectively.

Substrate 6, mount section 4, arm 8, arms 10A to 10D, and weights 2A to 2D are unitarily made of silicon-based material, such as glass, or material having a linear expansion coefficient close to that of silicon. Substrate 6 is directly bonded and fixed to mount section 4. Substrate 6 can be bonded to mount section 4 with adhesive or bumps; however, the direct bonding maintains an accurate distance between substrate 6 and each of weights 2A to 2D without considering the thickness of the adhesive or bumps.

Figure 3:
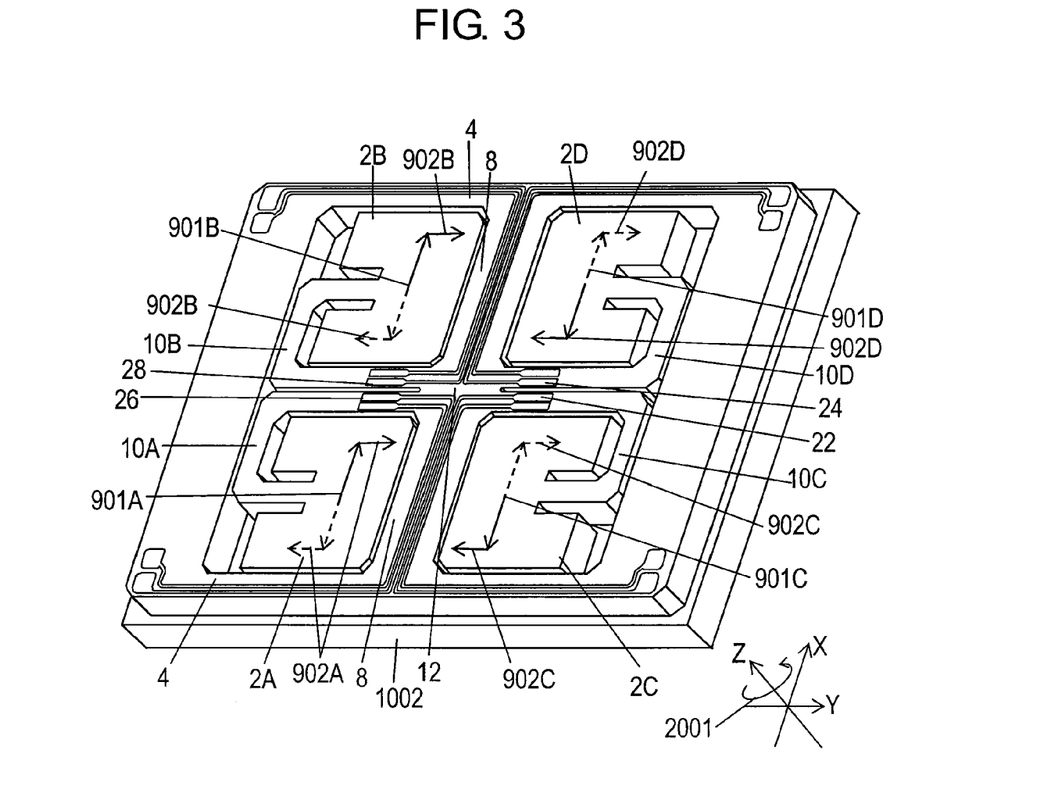
FIG. 3 is a perspective view of a sensor element of the acceleration sensor in accordance with the embodiment.

Acceleration sensor 1001 can detect an angular velocity as well. An operation of sensor element 1 of sensor 1001 detecting an angular velocity will be described below. FIG. 3 is a perspective view of sensor element 1. Arm 10C extending from supporter 12 and weight 2C connected to arm 10C have a resonance frequency intrinsic to arm 10C and weight 2C. An alternating-current (AC) voltage having this resonance frequency is applied between the upper electrode and the lower electrode of driving electrode 22 by a driving power supply so as to deflect arm 10C, thereby causing weight 2C to vibrate with the resonance frequency in direction 901C in parallel with the X-axis. Arms 10A, 10B, and 10D, and weights 2A, 2B, and 2D connected with arms 10A, 10B, and 10D, respectively, have a resonance frequency identical to the resonance frequency of arm 10C and weight 2C. Since supporter 12 is coupled to mount section 4 via flexible arm 8, the vibration of arm 10C and weight 2C at the resonance frequency transmits to arms 10A, 10B, and 10D via supporter 12, thereby causing weights 2A, 2B, and 2D to vibrate at the resonance frequency in directions 901A, 901B, and 901D, respectively in parallel with the X-axis. Sensing electrode 24 feeds back a voltage changing according to the vibration of arm 10D to the driving power supply. The driving power supply then determines a voltage, a frequency, and a phase of the AC voltage to be applied to driving electrode 22 so as to cause arm 10D to vibrate by a predetermined amplitude. This operation causes arms 10A to 10D to vibrate at the resonance frequency by a constant amplitude.

An operation of sensor element 1 receiving angular velocity 2001 in an anticlockwise direction about the Z-axis, namely, in a direction from weight 2A to weight 2C will be described. Weights 2A to 2D vibrate in directions 901A to 901D in parallel with the X-axis, respectively. The vibration of weights 2A to 2D produces a Coriolis force on weights 2A to 2D in directions 902A to 902D in parallel with the Y-axis, respectively, namely in a direction perpendicular to directions 901A to 901D. The Coriolis force produces a distortion on arms 10A to 10D. Detecting electrodes 26 and 28 output voltages in response to the distortion produced on arms 10A and 10B, hence detecting angular velocity 2001 based on the output voltages.

Figure 4:
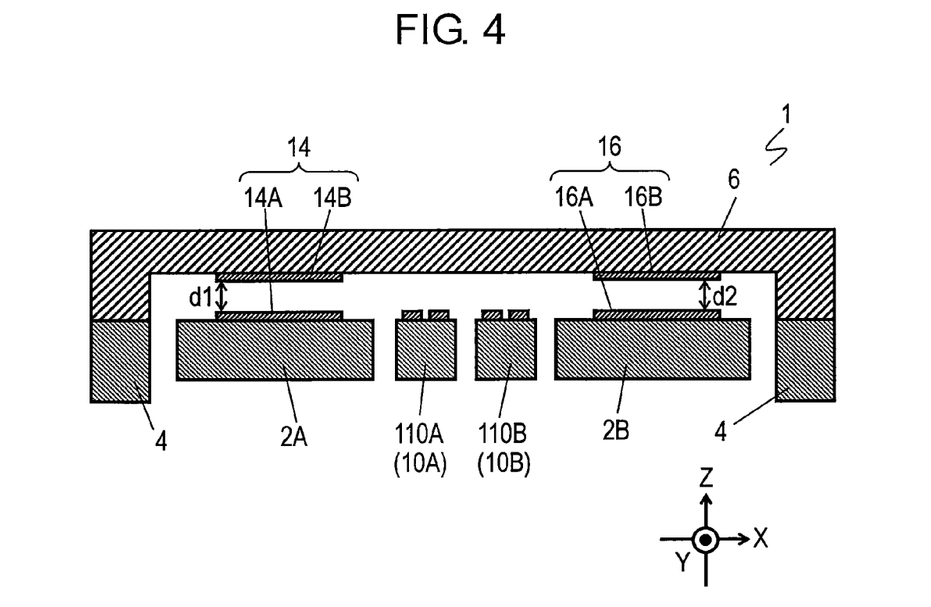
FIG. 4 is a sectional view of the acceleration sensor in accordance with the embodiment.
Figure 5:
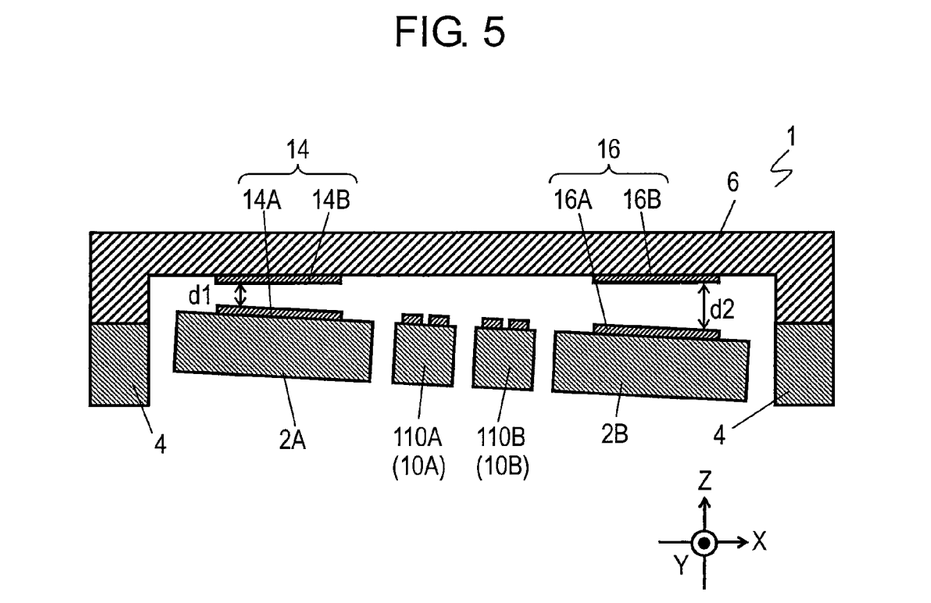
FIG. 5 is a sectional view of the acceleration sensor in accordance with the embodiment.

Next, an operation of acceleration sensor 1001 detecting an acceleration will be described below. FIGS. 4 and 5 are sectional views of sensor element 1.

When no acceleration is applied to sensor element 1, distance d1 between electrodes 14A and 14B is equal to distance d2 between electrodes 16A and 16B, as shown in FIG. 4. Similarly, when no acceleration is applied to sensor element 1, the distance between electrodes 18A and 18B is equal to the distance between electrodes 20A and 20B.

An acceleration applied to sensor element 1 in a direction from weights 2A and 2C toward weights 2B and 2D in parallel with the X-axis urges weights 2A to 2D to rotate on supporter 12 about the Y-axis, as shown in FIG. 5. Thus, distance d1 between electrodes 14A and 14B decreases, while distance d2 between electrodes 16A and 16B increases, so that the capacitance of opposed electrode unit 14 increases while the capacitance of opposed electrode unit 16 decreases. The acceleration can be detected based on the changes of electrostatic capacitances. Similarly, the distance between electrodes 18A and 18B decreases while the distance between electrodes 20A and 20B increases, so that the capacitance of opposed electrode unit 18 increases while the capacitance of opposed electrode unit 20 decreases. The acceleration can be detected also based on the changes of these capacitances.

An acceleration applied to sensor element 1 in the direction from weights 2B and 2D toward weights 2A and 2C in parallel with the X-axis urges weights 2A and 2D to rotate on supporter 12 about the Y-axis. Thus, distance d1 between electrodes 14A and 14B increases while distance d2 between electrodes 16A and 16B decreases, so that the capacitance of opposed electrode unit 14 decreases while the capacitance of opposed electrode unit 16 increases. The acceleration can be detected based on the changes of these capacitances. Similarly, the distance between electrodes 18A and 18B increases while the distance between electrodes 20A and 20B decreases, so that the capacitance of opposed electrode unit 18 decreases while the capacitance of opposed electrode unit 20 increases. The acceleration can be detected also based on the changes of these capacitances.

An acceleration applied to sensor element 1 in a direction from weights 2A and 2B toward weights 2C and 2D in parallel with the Y-axis urges weights 2A to 2D to rotate on supporter 12 about the X-axis. Thus, distance d1 between electrodes 14A and 14B decreases, while distance d2 between electrodes 18A and 18B increases, so that the capacitance of opposed electrode unit 14 increases while the capacitance of opposed electrode unit 18 decreases. The acceleration can be detected based on the changes of the capacitances. Similarly, distance d2 between electrodes 16A and 16B decreases while the distance between electrodes 20A and 20B increases, so that the capacitance of opposed electrode unit 16 increases while the capacitance of opposed electrode unit 20 decreases. The acceleration can be detected also based on the changes of these capacitances.

An acceleration applied to sensor element 1 in the direction from weights 2C and 2D toward weights 2A and 2B in parallel with the Y-axis urges weights 2A to 2D to rotate on supporter 12 about the X-axis. Thus, distance d1 between electrodes 14A and 14B increases while the distance between electrodes 18A and 18B decreases, so that the capacitance of opposed electrode unit 14 decreases while the capacitance of opposed electrode unit 18 increases. The acceleration can be detected based on the changes of these capacitances. Similarly, distance d2 between electrodes 16A and 16B increases while the distance between electrodes 20A and 20B decreases, so that the capacitance of opposed electrode unit 16 decreases while the capacitance of opposed electrode unit 20 increases. The acceleration can be detected also based on the changes of these capacitances.

Figure 6:
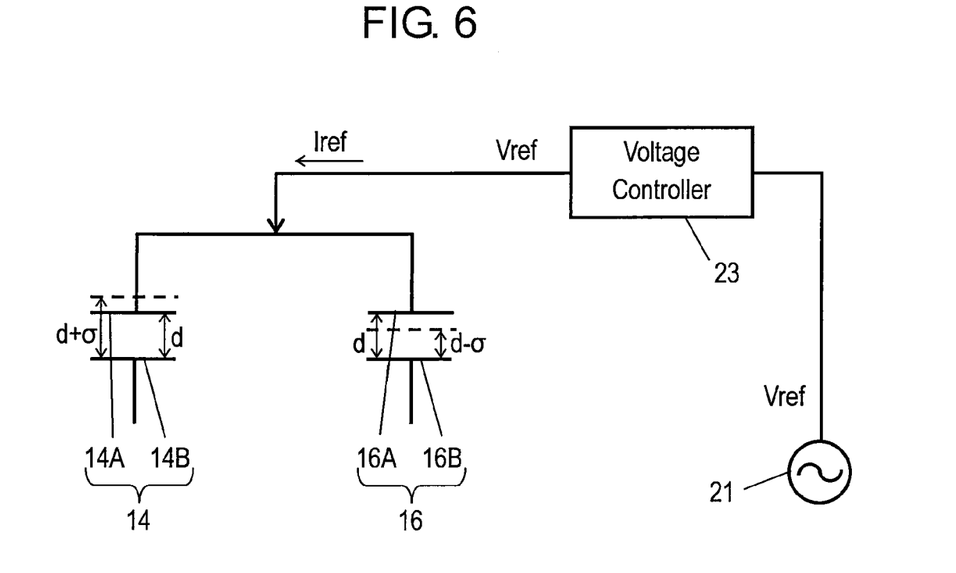
FIG. 6 is a circuit diagram of the acceleration sensor in accordance with the embodiment.

FIG. 6 is a circuit diagram of a part of acceleration sensor 1001. Electrode 14A and electrode 16A of opposed electrode units 14 and 16 are connected to each other. Reference voltage generator 21 generates a predetermined reference voltage Vref, an AC voltage having angular frequency $\omega$. Voltage controller 23 applies reference voltage Vref to electrodes 14A and 16A. When no acceleration is applied to sensor element 1, distance d is kept between electrodes 14A and 14B, between electrodes 16A and 16B, between electrodes 18A and 18B, and between electrodes 20A and 20B. Each of electrodes 14A, 14B, 16A, and 16B has area S. Differential current Iref which is a difference between a current flowing through opposed electrode unit 14 and a current flowing through opposed electrode unit 16 is expressed as Equation 1 based on dielectric constant $\epsilon$ of spaces between electrodes 14A and 14B and between electrodes 16A and 16B, displacement σ of electrodes 14A and 16A in parallel with the Z-axis due to the acceleration, and angular frequency ω of reference voltage Vref.

$$Iref = \omega \cdot Vref \cdot \varepsilon \cdot S \cdot [1/(d-\sigma) - 1/(d+\sigma)] \quad \text{(Equation 1)}$$
$$= \omega \cdot Vref \cdot \varepsilon \cdot S \cdot 2\sigma/(d^2 - \sigma^2)$$
$$\approx \omega \cdot Vref \cdot \varepsilon \cdot S \cdot 2\sigma/d^2$$

Figure 7:
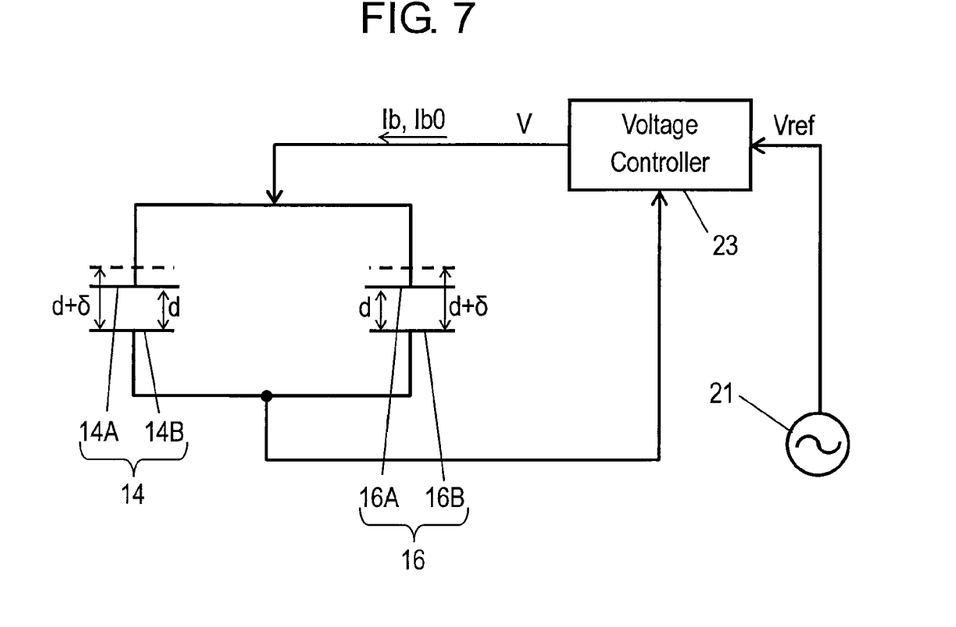
FIG. 7 is a circuit diagram of the acceleration sensor in accordance with the embodiment.

FIG. 7 is a circuit diagram of a part of acceleration sensor 1001. In FIG. 7, when the distances between electrodes 14A and 14B, between electrodes 16A and 16B, between electrodes 18A and 18B, and between electrodes 20A and 20B simultaneously increase, voltage controller 23 applies control voltage V higher than reference voltage Vref across the electrodes. When the distances between those electrodes simultaneously decrease, voltage controller 23 applies control voltage V lower than reference voltage Vref across the electrodes. Control voltage V is an AC voltage having angular frequency ω identical to that of reference voltage Vref.

When no acceleration is applied to sensor element 1, distance d is kept between electrodes 14A and 14B, between electrodes 16A and 16B, between electrodes 18A and 18B, and between electrodes 20A and 20B. Reference current Ib0 which is the sum of currents flowing through opposed electrode units 14 and 16 is expressed as Equation 2.

$$Ib0 = \omega \cdot Vref \cdot \varepsilon \cdot S \cdot [1/(d-\sigma) + 1/(d+\sigma)] \quad \text{(Equation 2)}$$
$$= \omega \cdot Vref \cdot \varepsilon \cdot S \cdot 2d/(d^2 - \sigma^2)$$
$$\approx \omega \cdot Vref \cdot \varepsilon \cdot S \cdot 2/d$$

Reference current Ib which is the sum of currents flowing through opposed electrode units 14 and 16 when distance d changes by displacement δ is expressed as Equation 3.

$$Ib = \omega \cdot Vref \cdot \varepsilon \cdot S \cdot [1/(d+\delta-\sigma) + 1/(d+\delta+\sigma)] \quad \text{(Equation 3)}$$
$$= \omega \cdot Vref \cdot \varepsilon \cdot S \cdot 2(d-\delta)/[(d+\delta)^2 - \sigma^2]$$
$$\approx \omega \cdot Vref \cdot \varepsilon \cdot S \cdot 2/(d+\delta)$$

Equation 4 is obtained by Equations 2 and 3.

$$Ib0/Ib = (d+\delta)/d \quad \text{(Equation 4)}$$

Sensing current Iv which is a difference between the currents flowing through opposed electrodes units 14 and 16 having control voltage V is applied thereto is expressed as Equation 5.

$$Iv = \omega \cdot Vref \cdot \varepsilon \cdot S \cdot [1/(d+\delta-\sigma) - 1/(d+\delta+\sigma)] \quad \text{(Equation 5)}$$
$$= \omega \cdot Vref \cdot \varepsilon \cdot S \cdot 2\sigma/[(d+\delta)^2 - \sigma^2]$$
$$\approx \omega \cdot Vref \cdot \varepsilon \cdot S \cdot 2\sigma/(d+\delta)^2$$

Control voltage V is determined such that differential current Iref obtained when distance d is kept between electrodes 14A and 14B and between electrodes 16A and 16B is equal to sensing current Iv obtained when distance (d+δ) is kept between electrodes 14A and 14B and between electrodes 16A and 16B.

$$Iv = Iref \quad \text{(Equation 6)}$$

Equations 1 and 5 are substituted in Equation 6 to provide control voltage V as Equation 7.

$$V/(d+\delta)^2 = Vref/d^2 \quad \text{(Equation 7)}$$
$$V = Vref \cdot (d+\delta)^2/d^2$$
$$= Vref \cdot (Ib0/Ib)^2$$

Control voltage V obtained by Equation 7 is applied to opposed electrode units 14 and 16, thereby making differential current Iref equal to sensing current Iv. Even when distances d between electrodes 14A and 14B, between electrodes 16A and 16B, between electrodes 18A and 18B, and between electrodes 20A and 20B changes by displacement δ, acceleration sensor 1001 detects the acceleration accurately similarly to the acceleration regardless of the changes of the distances.

Acceleration sensor 1001 can accurately detect the acceleration in parallel with the X-axis applied to sensor element 1, based sensing current Iv obtained from control voltage V. Similarly, acceleration sensor 1001 can accurately detect the acceleration in parallel with the Y-axis applied to sensor element 1, based on sensing current Iv which is a difference between the currents flowing through opposed electrode units 14 and 16.

In the case that the acceleration is detected based on a change of a capacitance, a voltage applied to the opposed electrode units affects the acceleration. The acceleration detected based on the sensing current is larger than an actual acceleration when a voltage applied to the opposed electrode units is high. The acceleration detected based on the sensing current is smaller than the actual acceleration when a voltage applied to the opposed electrode units is low.

When the distances between the electrodes of each one of opposed electrode units 14, 16, 18, and 20 simultaneously increase or decrease, the electrostatic capacitances change not by the acceleration in parallel with the X-axis or the Y-axis but by the acceleration in parallel with the Z-axis due to vibration. When the distances at opposed electrode units 14, 16, 18, and 20 increase simultaneously and the acceleration in parallel with the X-axis or the Y-axis is applied, the acceleration detected based on the sensing current is smaller than an actual acceleration. When the distances at opposed electrode units 14, 16, 18, and 20 decrease simultaneously and the acceleration is applied in parallel with the X-axis or the Y-axis, the acceleration detected based on the sensing current is larger than an actual acceleration.

Control voltage V applied to opposed electrode units 14, 16, 18, and 20 allows acceleration sensor 1001 to accurately detect the acceleration in parallel with the X-axis and the Y-axis even when the capacitances change due to the acceleration in parallel with the Z-axis The acceleration in parallel with the X-axis can be detected based on the sum of the capacitances of opposed electrode units 16 and 18 together with the sum of the capacitances of opposed electrode units 14 and 20. Similarly, the acceleration in parallel with the Y-axis can be detected based on the sum of the capacitances of opposed electrode units 18 and 20 together with the sum of the capacitances of opposed electrode units 14 and 16.

Figure 8:
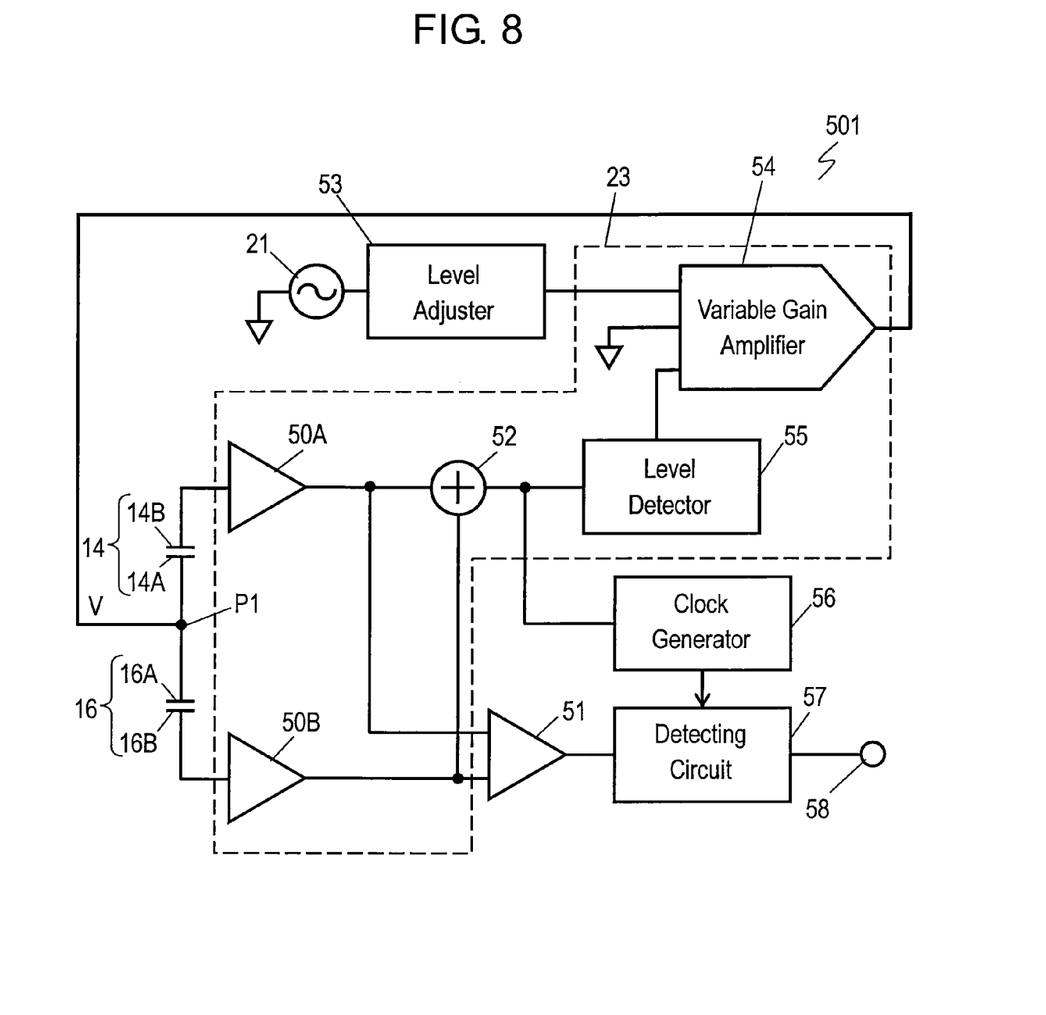
FIG. 8 is a block diagram of a processor of the acceleration sensor in accordance with the embodiment.

FIG. 8 is a block diagram of processor 501 of acceleration sensor 1001. As discussed above, voltage controller 23 applies control voltage V to electrode 14A of opposed electrode unit 14 and electrode 16A of opposed electrode unit 16. Voltage controller 23 produces control voltage V based on reference voltage Vref supplied from reference voltage generator 21.

An operation of voltage controller 23 is described below. An output port of reference voltage generator 21 is connected to level adjuster 53. Level adjuster 21 adjusts the amplitude of voltage Vref, and supplies voltage Vref to variable gain amplifier (VGA) 54. An output port of VGA 54 is connected to node P1 at which electrode 14A is connected to electrode 16A. CV converter amplifiers 50A and 50B output voltages in response to currents flowing through each of opposed electrode units 14 and 16, respectively. These currents change in response to the capacitances of the opposed electrode units, so that CV converter amplifiers 50A and 50B output voltages in response to the capacitances of opposed electrode units 14 and 16. Adder 52 adds the voltage output from amplifier 50A with the voltage output from amplifier 50B. Adder 52 outputs a voltage to level detector 55. Level detector 55 detects a level of the voltage. Level detector 55 can be implemented by a DC converter or a full-wave rectifier to smooth a voltage input thereto, and output a stable voltage, such as a direct-current (DC) voltage. An output port of level detector 55 is connected to VGA 54 for controlling a gain of VGA 54. VGA 54 changes the amplitude of reference voltage Vref by the gain determined in response to the output from level detector 55, i.e., in response to the reference current which is the sum of currents flowing through opposed electrode units 14 and 16. VGA 54 then outputs control voltage V determined by Equation 7 to opposed voltage units 14 and 16. Clock generator 56 generates a clock signal synchronized with control voltage V, i.e. reference voltage Vref based on the output from adder 52. Differential amplifier 51 outputs a difference between respective outputs of CV converter amplifiers 50A and 50B. The output from amplifier 51 contains a component corresponding to the acceleration in parallel with the X-axis. Detecting circuit 57 detects the output from differential amplifier 51 at a timing of the clock signal, and extracts the component corresponding to the acceleration. Detecting circuit 57 smoothes the component and outputs the smoothed component from output terminal 58.

That is, processor 501 detects a component of the acceleration of object 1002 in parallel with the X-axis based on the capacitances of opposed electrode units 14 and 16. Processor 501 applies control voltage V to opposed electrode units 14 and 16, and changes voltage V when the capacitance of opposed electrode units 14 and 16 increase simultaneously or decrease simultaneously. When the capacitances of opposed electrode units 14 and 16 decrease simultaneously, processor 501 increases control voltage V. When the capacitances of opposed electrode units 14 and 16 simultaneously increase, processor 501 reduces control voltage V.

Processor 501 detects a component of the acceleration in parallel with the Y-axis based on the capacitances of opposed electrode units 14 and 18. Circuit 501 applies control voltage V to opposed electrode units 14, 16, and 18, and changes voltage V when the capacitances of opposed electrode units 14, 16, and 18 increase simultaneously or decrease simultaneously. When the capacitances of opposed electrode units 14, 16, and 18 decrease simultaneously, processor 501 increases control voltage V. When the capacitances of opposed electrode units 14, 16, and 18 increase simultaneously greater, processor 501 reduces control voltage V.

Processor 501 can detect the component of the acceleration in parallel with the X-axis based on the sum of capacitances of opposed electrode units 14 and 18 together with the sum of the capacitances of opposed electrode units 16 and 20. In this case, processor 501 applies control voltage V to opposed electrode units 14, 16, 18 and 20. Processor 501 changes voltage V when the capacitances of opposed electrode units 14, 16, 18, and 20 increase simultaneously or decrease simultaneously. When the capacitances of opposed electrode units 14, 16, 18, and 20 decrease simultaneously, processor 501 increases control voltage V. When the capacitances of opposed electrode units 14, 16, 18, and 20 decreases simultaneously, processor 501 reduces control voltage V.

Processor 501 can detect the component of the acceleration in parallel with the Y-axis based on the sum of capacitances of opposed electrode units 14 and 16 together with the sum of the capacitances of opposed electrode units 18 and 20.

In sensor element 1 in accordance with this embodiment, four opposed electrode units 14, 16, 18, and 20 are placed at four corners of a rectangle. Opposed electrode units 14 and 16 are arranged in parallel with the X-axis, and opposed electrode units 18 and 20 are arranged also in parallel with the X-axis. Opposed electrode units 14 and 18 are arranged in parallel with the Y-axis, and opposed electrode units 16 and 20 are arranged also in parallel with the Y-axis. Thus, four opposed electrode units 14, 16, 18, and 20 of in sensor element 1 serve both as opposed electrode units arranged in parallel with the X-axis and as opposed electrode units arranged in parallel with the Y-axis.

Figure 9:
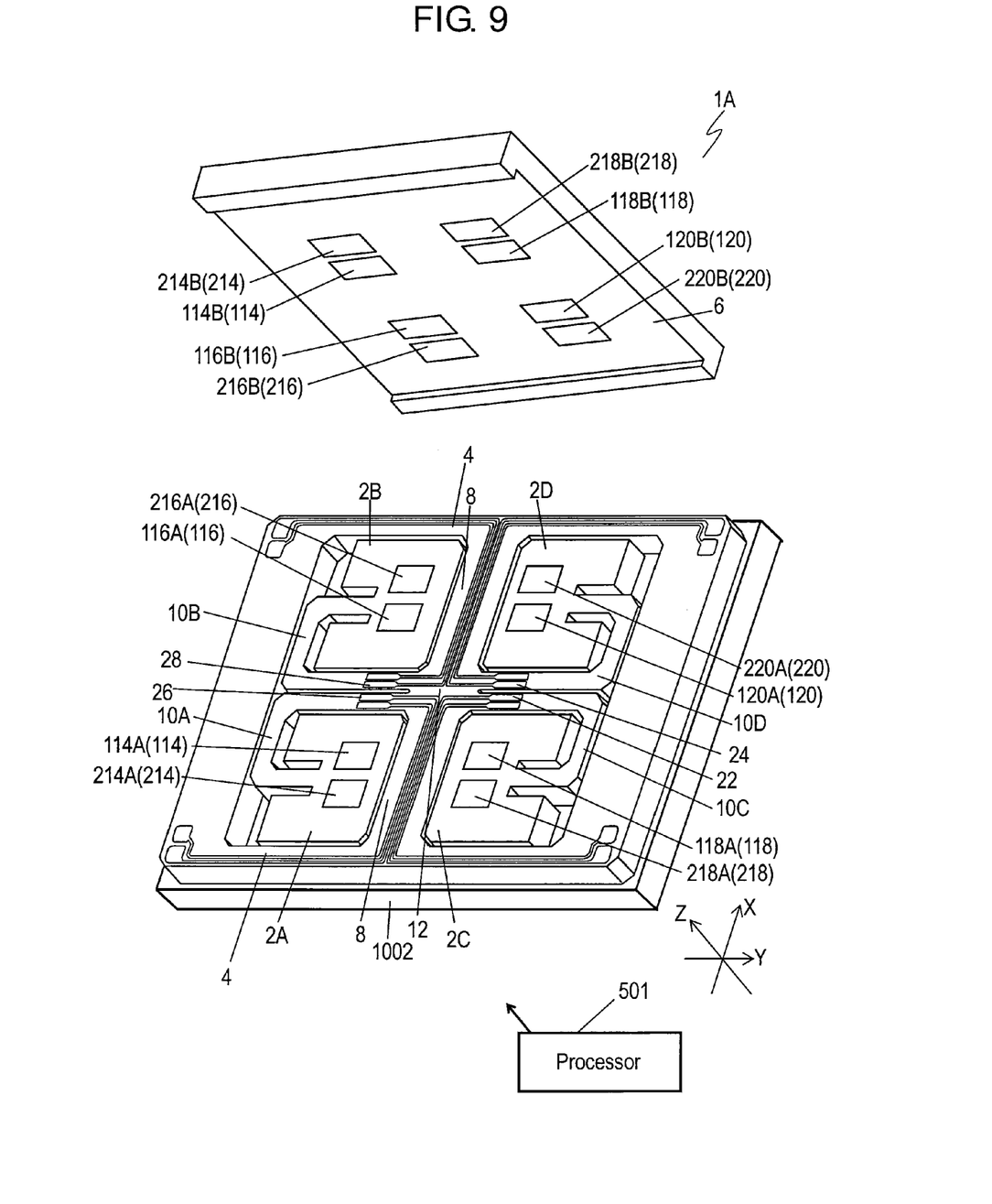
FIG. 9 is an exploded perspective view of another acceleration sensor in accordance with the embodiment.

FIG. 9 is an exploded perspective view of sensor element 1A of another acceleration sensor in accordance with this embodiment. In FIG. 9, component identical to those in FIG. 1 are denoted by the same reference numerals, and their description will be omitted. Sensor element 1A shown in FIG. 9 includes opposed electrode units 114, 116, 118, 120, 214, 216, 218, and 220 instead of opposed electrode units 14, 16, 18, and 20 of sensor element 1 shown in FIG. 1. Opposed electrode unit 114 includes electrode 114A placed on weight 2A and electrode 114B placed on substrate 6. Electrode 114A is spaced away from and faces electrode 114B in parallel with the Z-axis. Opposed electrode unit 214 includes electrode 214A placed on weight 2A and electrode 214B placed on substrate 6. Electrode 214A is spaced away from and faces electrode 214B in parallel with the Z-axis. Opposed electrode unit 116 includes electrode 116A placed on weight 2B and electrode 116B placed on substrate 6. Electrode 116A is spaced away from and faces electrode 116B in parallel with the Z-axis. Opposed electrode unit 216 includes electrode 216A placed on weight 2B and electrode 216B placed on substrate 6. Electrode 216A is spaced away from and faces electrode 216B in parallel with the Z-axis. Opposed electrode unit 118 includes electrode 118A placed on weight 2C and electrode 118B placed on substrate 6. Electrode 118A is spaced away from and faces electrode 118B in parallel with the Z-axis. Opposed electrode unit 218 includes electrode 218A placed on weight 2C and electrode 218B placed on substrate 6. Electrode 218A is spaced away from and faces electrode 218B in parallel with the Z-axis. Opposed electrode unit 120 includes electrode 120A placed on weight 2D and electrode 120B placed on substrate 6. Electrode 120A is spaced away from and faces electrode 120B in parallel with the Z-axis. Opposed electrode unit 220 includes electrode 220A placed on weight 2D and electrode 220B placed on substrate 6. Electrode 220A is spaced away from and faces electrode 220B in parallel with the Z-axis. Opposed electrode units 114 and 116 are arranged in parallel with the X-axis. Opposed electrode units 118 and 120 are arranged also in parallel with the X-axis. Opposed electrode units 214 and 218 are arranged in parallel with the Y-axis. Opposed electrode units 216 and 220 are arranged also in parallel with the Y-axis. Thus, sensor element 1A includes the opposed electrode units arranged in parallel with the X-axis independent from the opposed electrode units arranged in parallel with the Y-axis, but operates similarly to sensor element 1 and provides the same effects.

Processor 501 detects the component of the acceleration in parallel with the X-axis based on capacitances of opposed electrode units 114 and 116, and detects the component of the acceleration in parallel with the Y-axis based on capacitances of opposed electrode units 214 and 218. Processor 501 applies control voltage V to opposed electrode units 114, 116, 214, and 218, and changes voltage V when the capacitances of opposed electrode units 114, 116, 214, and 218 simultaneously decreases or simultaneously increase. When the capacitances of opposed electrode units 114, 116, 214, and 218 simultaneously decrease, processor 501 increases control voltage V. When the capacitances of opposed electrode units 114, 116, 214, and 218 simultaneously increase, processor 501 reduces control voltage V.

Processor 501 can detect the component of the acceleration in parallel with the X-axis based on the sum of the capacitances of opposed electrode units 114 and 116 together with the sum of the capacitances of opposed electrode units 118 and 120. Processor 501 can detect the component of the acceleration in parallel with the Y-axis based on the sum of the capacitance of opposed electrode units 214 and 216 together with the sum of the capacitances of opposed electrode units 218 and 220. In these cases, processor 501 applies control voltage V to opposed electrode units 114, 116, 118, 120, 214, 216, 218, and 220, and changes control voltage V when the capacitances of all of these opposed electrode units simultaneously decrease or simultaneously increase. When all the capacitances decrease simultaneously, processor 501 increases control voltage V. When all the capacitances increase simultaneously, processor 501 reduces control voltage V.

Figure 10:
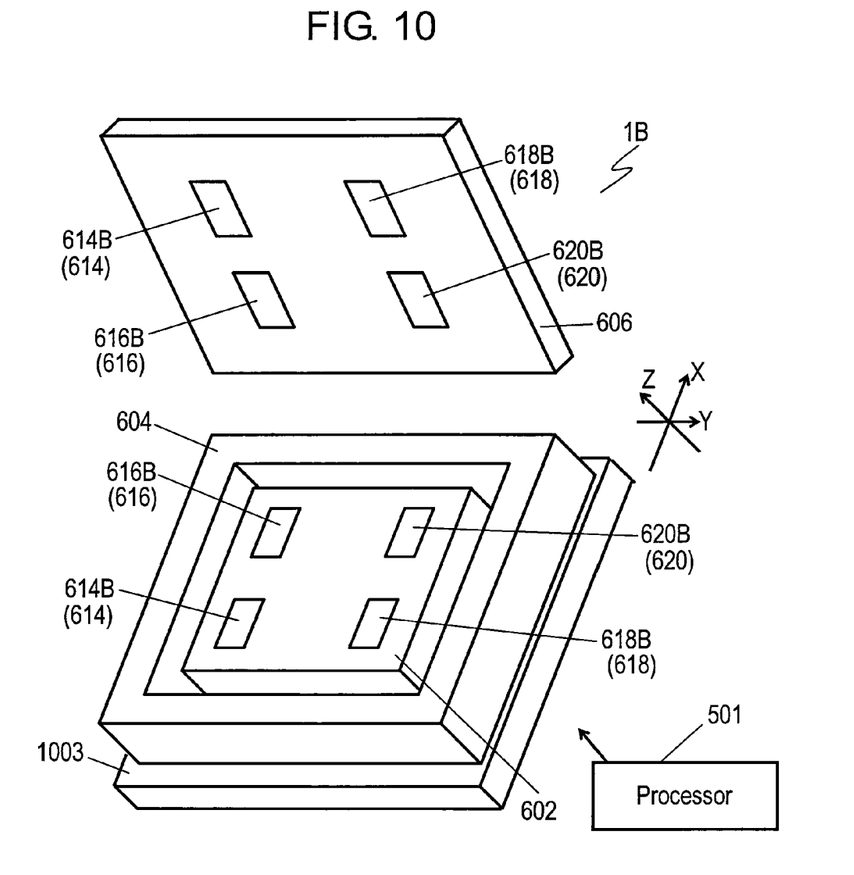
FIG. 10 is an exploded perspective view of a further acceleration sensor in accordance with the embodiment.
Figure 11:
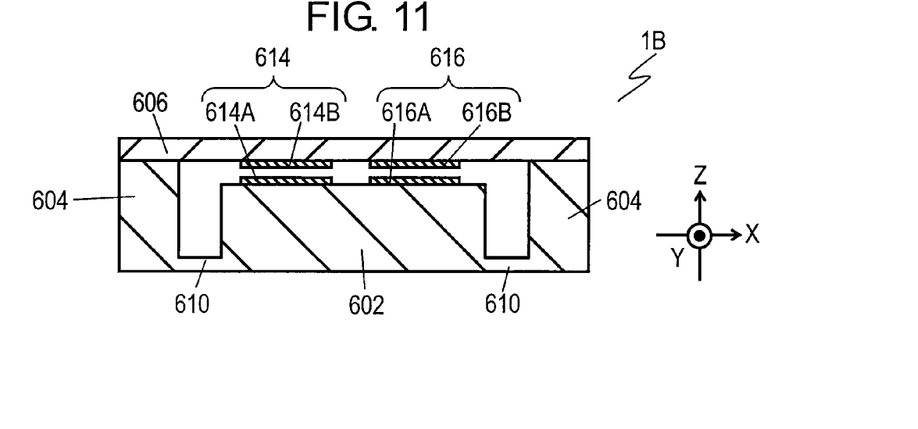
FIG. 11 is a sectional view of the acceleration sensor shown in FIG. 10.

Sensor element 1 shown in FIG. 1 includes weights 2A, 2B, 2C, and 2D having electrodes 14A, 16A, 18A, and 20A thereon, respectively. The number of those weights is not limited to four. FIG. 10 is an exploded perspective view of sensor element 1B of a further acceleration sensor in accordance with this embodiment. FIG. 11 is a sectional view of sensor element 1B shown in FIG. 10.

In FIGS. 10 and 11, an X-axis, a Y-axis, and a Z-axis perpendicular to each other are defined. Sensor element 1B is fixed to object 1003 having an acceleration to be detected. Sensor element 1B includes mount section 604 fixed to object 1003, weight 602, flexible section 610 which couples weight 602 to mount section 604. Mount section 604 has a frame shape surrounding flexible section 610 and weight 602, and is mounted to substrate 606. Electrodes 614A, 616A, 618A, and 620A are placed on weight 602. Electrodes 614B, 616B, 618B, and 620B placed on substrate 606 are spaced away from and face electrodes 614A, 614B, 614C, and 614D in parallel with the Z-axis, respectively. Electrodes 614A and 614B form opposed electrode unit 614 having a capacitance between electrodes 614A and 614B. Electrodes 616A and 616B form opposed electrode unit 616 having a capacitance between electrodes 616A and 616B. Electrodes 618A and 618B form opposed electrode unit 618 having a capacitance between electrodes 618A and 618B. Electrodes 620A and 620B form opposed electrode unit 620 having a capacitance between electrodes 620A and 620B. Electrodes 614A and 616A are arranged in parallel with the X-axis. Electrodes 614B and 616B are arranged also in parallel with the X-axis. In other words, opposed electrode units 614 and 616 are arranged in parallel with the X-axis. Electrodes 618A and 620A are arranged in parallel with the X-axis. Electrodes 618B and 620B are arranged also in parallel with the X-axis. In other words, opposed electrode units 618 and 620 are arranged in parallel with the X-axis. Electrodes 614A and 618A are arranged in parallel with the Y-axis. Electrodes 614B and 618B are arranged also in parallel with the Y-axis. In other words, opposed electrode units 614 and 618 are arranged in parallel with the Y-axis. Electrodes 616A and 620A are arranged in parallel with the Y-axis. Electrodes 616B and 620B are arranged also in parallel with the Y-axis. In other words, opposed electrode units 616 and 620 are arranged in parallel with the Y-axis.

An acceleration in parallel with the X-axis and the Y-axis is applied to sensor element 1B, and urges weight 602 to rotate about the X-axis and the Y-axis, similarly to sensor element 1 shown in FIG. 5. Electrodes 614A, 616A, 618A, and 620A are displaced by the acceleration, similarly to the displacement of electrodes 14A, 16A, 18A and 20A of sensor element 1 shown in FIG. 1. In other words, opposed electrode units 614, 616, 618 and 620 of sensor element 1B operate similarly to opposed electrode units 14, 16, 18 and 20 of sensor element 1 shown in FIG. 1. Processor 501 shown in FIG. 8 is connected to opposed electrode units 614, 616, 618 and 620 of sensor element 1B instead of opposed electrode units 14, 16, 18 and 20 of sensor element 1 so as to detect the acceleration accurately.

Figure 12:
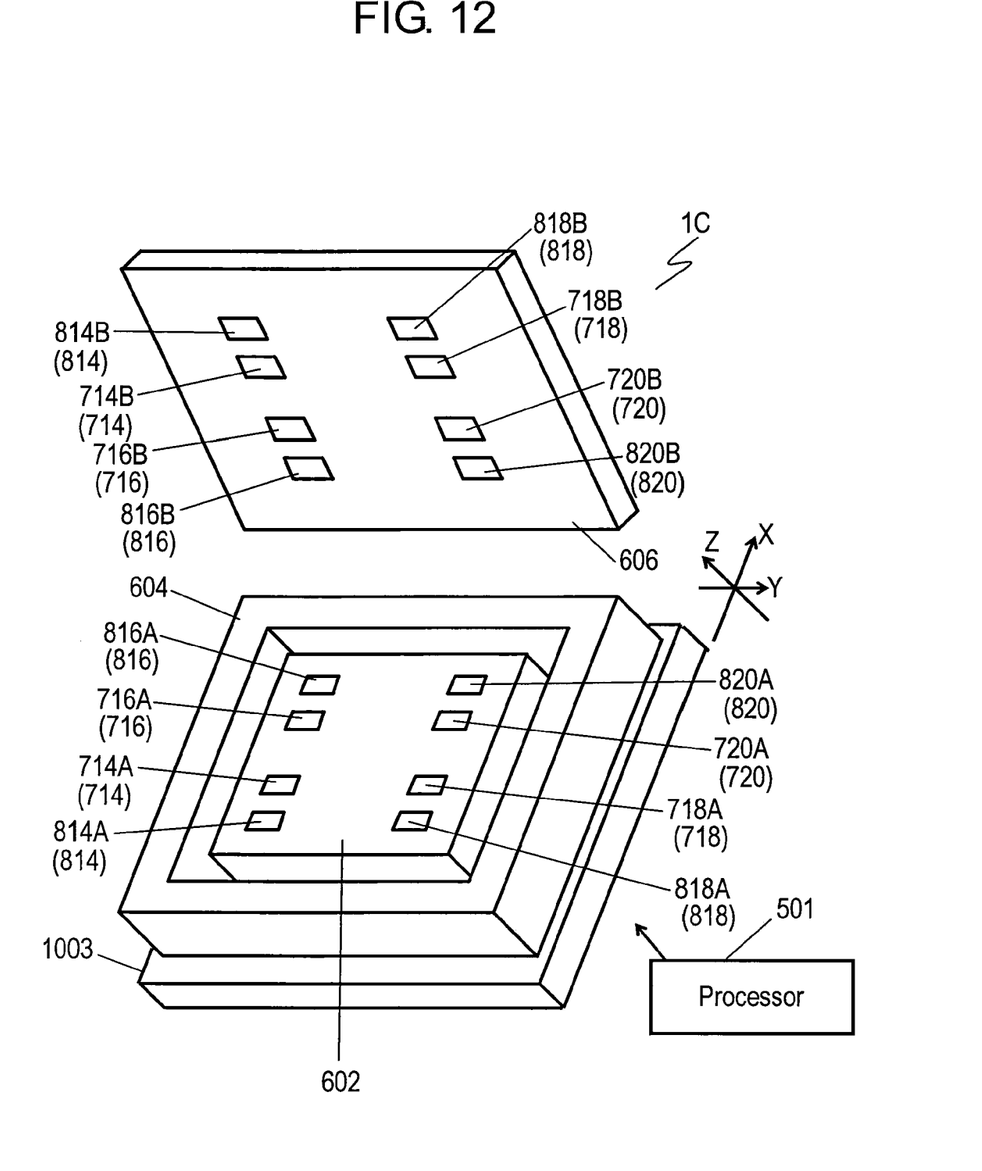
FIG. 12 is an exploded perspective view of a further acceleration sensor in accordance with the embodiment.

FIG. 12 is an exploded perspective view of sensor element 1C of a further acceleration sensor in accordance with this embodiment. In FIG. 12, components identical to those of sensor element 1B shown in FIG. 10 are denoted by the same reference numerals, and their description will be omitted. Sensor element 1C shown in FIG. 12 includes opposed electrode units 714, 716, 718, 720, 814, 816, 818, and 820 instead of opposed electrode units 614, 616, 618, and 620 of sensor element 1B shown in FIG. 10. Opposed electrode unit 714 includes electrode 714A placed on weight 602 and electrode 714B placed on substrate 606. Electrode 714A is spaced away from and faces electrode 714B in parallel with the Z-axis. Opposed electrode unit 814 includes electrode 814A placed on weight 602 and electrode 814B placed on substrate 606. Electrode 814A is spaced away from and faces electrode 814B in parallel with the Z-axis. Opposed electrode unit 716 includes electrode 716A placed on weight 602 and electrode 716B placed on substrate 606. Electrode 716A is spaced away from and faces electrode 716B in parallel with the Z-axis. Opposed electrode unit 816 includes electrode 816A placed on weight 602 and electrode 816B placed on substrate 606. Electrode 816A is spaced away from and faces electrode 816B in parallel with the Z-axis. Opposed electrode unit 718 includes electrode 718A placed on weight 602 and electrode 718B placed on substrate 606. Electrode 718A is spaced away from and faces electrode 718B in parallel with the Z-axis. Opposed electrode unit 818 includes electrode 818A placed on weight 602 and electrode 818B placed on substrate 606. Electrode 818A is spaced away from and faces electrode 818B in parallel with the Z-axis. Opposed electrode unit 720 includes electrode 720A placed on weight 602 and electrode 720B placed on substrate 606. Electrode 720A is spaced away from and faces electrode 720B in parallel with the Z-axis. Opposed electrode unit 820 includes electrode 820A placed on weight 602 and electrode 820B placed on substrate 606. Electrode 820A is spaced away from and faces electrode 820B in parallel with the Z-axis. Opposed electrode units 714 and 716 are arranged in parallel with the X-axis. Opposed electrode units 718 and 720 are arranged in parallel with the X-axis. Opposed electrode units 814 and 818 are arranged in parallel with the Y-axis. Opposed electrode units 816 and 820 are arranged in parallel with the Y-axis. As discussed above, sensor element 1C has opposed electrode units arranged in parallel with the X-axis independent of opposed electrode units arrange in parallel with the Y-axis, but operates similarly and provides the same effects.

INDUSTRIAL APPLICABILITY

An acceleration sensor according to the present invention detects an acceleration accurately, and is useful for various electronic devices which perform attitude-control or navigation for mobile carriers such as airplanes, cars, robots, vessels, or vehicles.

The invention claimed is:

1. An acceleration sensor comprising:
   a substrate;
   a flexible section having flexibility and coupled to the substrate;
   a weight coupled to the substrate via the flexible section, wherein the weight has a first main surface and the substrate has a second main surface; and
   a first opposed electrode unit including
   a first electrode placed on the first main surface of the weight,
   a second electrode placed on the second main surface of the substrate and spaced away from and facing the first electrode, the first electrode and the second electrode providing a first capacitance between the first electrode and the second electrode;
   a second opposed electrode unit including
   a third electrode placed on the first main surface of the weight,
   a fourth electrode placed on the second main surface of the substrate and spaced away from and facing the third electrode, the third electrode and the fourth electrode providing a second capacitance between the third electrode and the fourth electrode, wherein
      the first electrode and the third electrode are arranged along a first direction,
      the second electrode and the fourth electrode are spaced away from and face the first electrode and the third electrode along a second direction perpendicular to the first direction, respectively;
      a processor adapted to detect a component of an acceleration along the first direction applied to an object based on the first capacitance and the second capacitance, apply a control voltage to the first opposed electrode unit and the second opposed electrode unit, and change the control voltage when both of the first capacitance and the second capacitance simultaneously increase or simultaneously decrease.

2. The acceleration sensor according to claim 1, wherein the control voltage is increased when both of the first capacitance and the second capacitance simultaneously decrease, and
the control voltage is reduced when both of the first capacitance and the second capacitance simultaneously increase.

3. The acceleration sensor according to claim 1, wherein the weight includes
   a first weight having the first electrode thereon, and
   a second weight having the second electrode thereon.

4. The acceleration sensor according to claim 1 further comprising:
   a third opposed electrode unit including
      a fifth electrode placed on the weight,
      a sixth electrode spaced away from and facing the fifth electrode, the fifth electrode and the sixth electrode providing a third capacitance between the fifth electrode and the sixth electrode; and
   a fourth opposed electrode unit including
      a seventh electrode placed on the weight,
      an eighth electrode spaced away from and facing the seventh electrode, the seventh electrode and the eighth electrode providing a fourth capacitance between the seventh electrode and the eighth electrode, wherein
   the fifth electrode and the seventh electrode are arranged along the first direction,
   the sixth electrode and the eighth electrode are spaced away from and face the fifth and the seventh electrodes along the second direction, respectively,
   the component of the acceleration along the first direction based on a sum of the first capacitance and the third capacitance together with a sum of the second capacitance and the fourth capacitance,
   the control voltage is applied to the first opposed electrode unit, the second opposed electrode unit, the third opposed electrode unit, and the fourth opposed electrode unit, and
   the control voltage is changed when all of the first capacitance, the second capacitance, the third capacitance, and the fourth capacitance simultaneously increase or simultaneously decrease.

5. The acceleration sensor according to claim 4, wherein the control voltage is increased when all of the first capacitance, the second capacitance, the third capacitance, and the fourth capacitance simultaneously decrease, and
the control voltage is reduced when all of the first capacitance, the second capacitance, the third capacitance, and the fourth capacitance simultaneously increase.

6. The acceleration sensor according to claim 4, wherein the first electrode and the fifth electrode are arranged along a third direction perpendicular to the first direction and the second direction, and
the third electrode and the seventh electrode are arranged along the third direction, and
a component of the acceleration along the third direction is detected based on a sum of the first capacitance and the second capacitance together with a sum of the third capacitance and the fourth capacitance.

7. The acceleration sensor according to claim 4, wherein the weight includes
   a first weight having the first electrode thereon,
   a second weight having the second electrode thereon,
   a third weight having the third electrode thereon, and
   a fourth weight having the fourth electrode thereon.

8. The acceleration sensor according to claim 1 further comprising
   a third opposed electrode unit including
      a fifth electrode placed on the weight,
      a sixth electrode spaced away from and facing the fifth electrode, the fifth electrode and the sixth electrode providing a third capacitance between the fifth electrode and the sixth electrode, wherein
   the first electrode and the fifth electrode are arrange along a third direction perpendicular to the first direction and the second direction,
   the sixth electrode is spaced away from and faces the fifth electrode along the second direction, the component of the acceleration along the third direction is detected based on the first capacitance and the third capacitance, the control voltage is applied to the first opposed electrode unit, the second opposed electrode unit, and the third opposed electrode unit, and the control voltage is changed when all of the first capacitance, the second capacitance, and the third capacitance simultaneously increase or simultaneously decrease.

9. The acceleration sensor according to claim 8, wherein the control voltage is increased when all of the first capacitance, the second capacitance, the third capacitance simultaneously decrease, and the control voltage is reduced when all of the first capacitance, the second capacitance, the third capacitance simultaneously increase.

10. The acceleration sensor according to claim 8, wherein the weight includes
   a first weight having the first electrode thereon,
   a second weight having the second electrode thereon, and
   a third weight having the third electrode thereon.

11. The acceleration sensor according to claim 1 further comprising:
   a third opposed electrode unit including
      a fifth electrode placed on the weight,
      a sixth electrode spaced away from and facing the fifth electrode, the fifth electrode and the sixth electrode providing a third capacitance between the fifth electrode and the sixth electrode; and
   a fourth opposed electrode unit including
      a seventh electrode placed on the weight,
      an eighth electrode spaced away from and facing the seventh electrode, the seventh electrode and the eighth electrode providing a fourth capacitance between the seventh electrode and the eighth electrode, wherein
   the fifth electrode and the seventh electrode are arranged along a third electrode perpendicular to the first direction and the second direction,
   the sixth electrode and the eight electrode are spaced away from and faces the fifth electrode and the seventh electrode along the second direction, respectively
   a component of the acceleration along the third direction is detected based on the third capacitance and the fourth capacitance,
   the control voltage is applied to the first opposed electrode unit, the second opposed electrode unit, the third opposed electrode unit, and the third opposed electrode unit, and
   the control voltage is changed when all of the first capacitance, the second capacitance, the third capacitance, and the fourth capacitance simultaneously increase or simultaneously decrease.

12. The acceleration sensor according to claim 11, wherein
   the control voltage is increased when all of the first capacitance, the second capacitance, the third capacitance, and the fourth capacitance simultaneously decrease, and
   the control voltage is reduced when all of the first capacitance, the second capacitance, the third capacitance, and the fourth capacitance simultaneously increase.

13. The acceleration sensor according to claim 11, wherein the weight includes
   a first weight having the first electrode and the third electrode thereon,
   a second weight having the second electrode thereon, and
   a third weight having the fourth electrode thereon.

14. The acceleration sensor according to claim 1, wherein the processor comprises:
   a level detector adapted to detect a component of an acceleration along the first direction applied to the object based on the first capacitance and the second capacitance; and
   a voltage controller adapted to apply control voltage to the first opposed electrode unit and the second opposed electrode unit and change the control voltage when both of the first capacitance and the second capacitance simultaneously increase or simultaneously decrease.

* * * * *